Oct. 31, 1967  SHUNJI MIYOSHI ET AL  3,350,181
SPACERS FOR MULTIPLE GLASS SHEET GLAZING UNIT
Filed March 3, 1965  2 Sheets-Sheet 1

INVENTORS
Shunji Miyoshi
Takehiro Miura
Tatsuo Arai
BY
Bailey, Stephens & Huettig
Attorneys Oct. 31, 1967 SHUNJI MIYOSHI ET AL 3,350,181
SPACERS FOR MULTIPLE GLASS SHEET GLAZING UNIT
Filed March 3, 1965 2 Sheets-Sheet 2

INVENTORS
Shunji Miyoshi
Takehiro Miura
Tatsuo Arai
BY
Bailey, Stephens & Huettig
Attorneys 3,350,181
SPACERS FOR MULTIPLE GLASS SHEET
GLAZING UNIT
Shunji Miyoshi, Yokohama, Takehiro Miura, Yamato, and Tatsuo Arai, Yokohama, Japan, assignors to Asahi Glass Co., Ltd., Chiyoda-ku, Tokyo, Japan, a corporation of Japan
Filed Mar. 3, 1965, Ser. No. 436,797
Claims priority, application Japan, Mar. 3, 1964, 39/12,625
11 Claims. (Cl. 29—183.5)

The present invention relates to a spacer for the multiple glass sheet glazing unit which has a pair of glass sheet kept by a metallic spacer in a parallel state spaced apart from each other.

It is an object of the present invention to provide a spacer which, even when the multiple glass sheet glazing unit is subjected to a repeated load, does not cause cracks in the spacer due to the fatigue failure nor breaking away of the bonding surface between the spacer and the glass sheet.

Another object of the present invention is to provide a multiple glass sheet glazing unit which is useful for the aircraft, the vehicle, the railway car and the like.

Other objects, features and advantages will be apparent from the following description of the invention.

The multiple glass sheet glazing unit has excellent adiabatic ability and is transparent, and is also used as a material for the refrigerating case, the window and others. However, in case where the multiple glass sheet glazing unit is used at the place or portion where the mechanical vibration is imparted, or the pressure applied thereto varies repeatedly and in a wide range, its performance is not guaranteed, because repeated stress is produced in the spacer due to the mechanical vibration or the fluctuation of pressure, and as a result thereof, cracks in the spacer or breaking away of the bonding surface between the spacer and the glass sheet is caused.

The present invention is intended to obtain a spacer for the multiple glass sheet glazing unit which can also be effectively used in the portion or place receiving repeated load.

The spacer is provided with a pair of parallel surfaces (bonding surface with the glass sheet). The multiple glass sheet glazing unit is formed by bonding air-tightly or hermetically a pair of glass sheets to the said parallel surfaces of the spacer. For the purpose of bonding the glass sheet to the spacer, metalicon is usually applied to the portion or portions of glass sheet to be bonded with the spacer, and the glass sheet and the spacer are bonded firmly by solder, but sometimes the glass sheet and the spacer are bonded together by using adhesives such as epoxy resin, butyl rubber, thiokol, silicon rubber and the like. A sectional shape cut by a plane perpendicular to the longitudinal or axial direction of the spacer has uniform shape, except for its abutment.

As a usual material for constituting the spacer is an alloy of which principal constituent is Pb and which contains 90% by weight or more of Pb and one or more elements selected from the group consisting of Cd, Bi, Sn and Sb as its by-constituent. Furthermore, it may contain Cu and/or Ca as a microelement.

The spacer of the present invention is extremely effective for preventing the damage of the multiple glass sheet glazing unit in which the spacer having Pb as its principal constituent as described above is used.

When load is applied to the multiple glass sheet glazing unit, the spacer changes its shape or deforms and stress is produced in the spacer. The magnitude of stress produced in the spacer is a function of the load applied to the multiple glass sheet glazing unit, the size of the glass sheet, the thickness of the glass sheet, the spacing between the glass sheets (this spacing is substantially the same as the height of the spacer), the kind of material of the spacer and the like, and said magnitude is also a function of the width of the section (cf. section 8 shown in FIG. 12) cut by the plane parallel to the bonding surface of the spacer (this sectional width is referred to hereafter as a "thickness" of the spacer). In case when the multiple glass sheet glazing unit is subjected to a given load, the magnitude of strain or distortion produced in the spacer can be reduced or decreased by increasing the thickness of the spacer. That is, the increase of the thickness of the spacer diminishes or decreases the tendency to cause cracks in the spacer in case the repeated load is applied to the multiple glass sheet glazing unit. The formation of cracks can be completely prevented or avoided by increasing the thickness of the spacer above the definite value. However, the bonding surface between the spacer and the glass sheet becomes liable to break away as the thickness of the spacer increases. Accordingly, it is very difficult to prevent the formation of cracks in the spacer itself and, at the same time, to prevent the breaking away of the spacer from the glass sheet. This difficulty increases as the spacing between the glass sheets becomes narrower. By these reasons as described above, it has not hitherto been known that the multiple glass glazing unit which is guaranteed in its performance even in cases when used at the place where the repeated load is applied.

Some multiple glass sheet glazing units are being employed as a material for the window of the super high speed railway car or vehicle, for example, of 200 km./hour known in Japan as the Shin Tokaido line. In the multiple glass sheet glazing unit mounted on such super high speed railway car, there occurs the repeated stress in the spacer by the vibration of the car or the pressure change resulting from the passing through the tunnel or the passing by each other of the cars. Among these repeated stresses, the repeated stress produced in case of passing by each other of the cars through the tunnel is the largest.

According to the present invention, there is provided a spacer for the multiple glass sheet glazing unit which can be used under such conditions as described above.

For a better understanding of the invention and to show how the same may be carried into effect, reference is now made by way of example to the accompanying drawings, in which.

Figure 1:
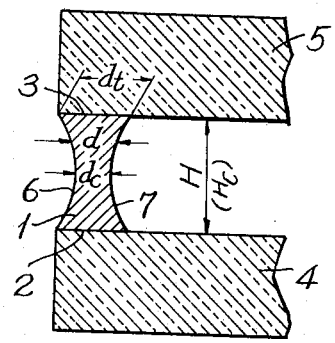
FIG. 1 is a fragmentary sectional view of a spacer of the present invention applied to the multiple glass sheet glazing unit, cut by a plane perpendicular to the longitudinal or axial direction (line X—X' in FIG. 12).

The spacer of the present invention has such a specific shape that a sectional area per unit length of the spacer in section cut by a plane parallel to the bonding surface (this section is hereinafter shortly referred to as "section") is the smallest in case when the cutting has been performed in the middle of the spacer 1 (namely in the middle of the bonding surfaces 2 and 3 in the drawing) and further, at least in this neighborhood, the sectional area increases continuously and smoothly as the section gets away from the middle and moreover, the area in this section does not exceed substantially the area of the bonding surface per unit length of the spacer, and furthermore, the whole of the spacer is constituted with homogeneous material.

As the area per unit length of the spacer in the said section is proportional to the sectional width of the spacer (that is, the thickness of the spacer), the width of the spacer is also the smallest in the middle portion, and it is apparent that the width of the spacer increases smoothly in this neighborhood.

The minimum and the maximum values of the thickness of the spacer in the portion, where the sectional area is increasing continuously and smoothly, that is, in the portion where the thickness of the spacer is increasing continuously and smoothly, are shown as $d_c$ and $d_t$ respectively. In the embodiments shown in FIG. 1 to FIG. 7, $d_t$ coincides with the width of the bonding surfaces with a pair of glass sheets 4 and 5 and in the embodiments shown in FIGS. 8 and 9, $d_t$ is shorter by the length shown by $l$ than the width of the bonding surface. However, as shown in the embodiment in FIG. 3, in case where the extreme end 10 of the bonding surface of the spacer is slightly cut away, the thickness of the spacer, the sectional area and the area of the bonding surface may be measured as if there is no cutting away. In the embodiment shown in FIG. 1, the thickness of the spacer is changing continuously over the whole height of the spacer shown by H. That is, in this embodiment the whole height H and the portion $H_c$ where the thickness of the spacer is changing continuously and smoothly coincide with each other. The side surface 6 or 7 of this spacer is constituted by such a curved cylindrical surface that the intersectional line of the said curved cylindrical surface with the perpendicular plane to the axis of the spacer is a circular arc. (For simplicity, the case like this is hereinafter referred to as "the side is constituted by circular arc," and in case where the side is constituted by other curved cylindrical surfaces, it is also briefly referred to in the same manner). In the embodiment shown in FIG. 2, the thickness of the spacer is changing continuously only in the portion expressed by "$H_c(H_c<H)$" and the middle portions of the both side surfaces of the spacer are constituted by hyperbola.

In FIGS. 3, 4, 5 and 6, one side surface of the spacer is constituted by a straight line and the other side is constituted by semicircle, hyperbola, pallabola or ellipse respectively, and in these spacers the thickness changes continuously and smoothly only the portion indicated by $H_c$.

Figure 7:
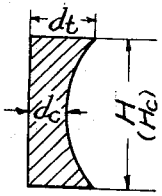

In FIG. 7, an embodiment of the spacer is shown of which one side surface is constituted by a straight line and the other side surface by hyperbola and the thickness changes continuously and smoothly over the whole height indicated by $H(H=H_c)$.

Figure 13:
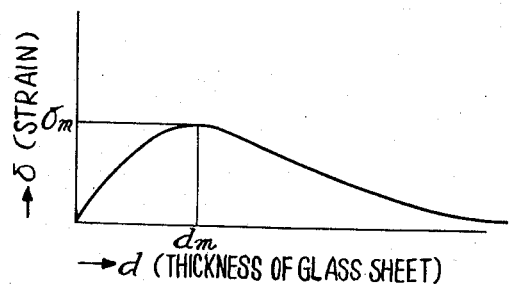
FIG. 13 is a diagram illustrating the relation of the thickness of a spacer and the maximum stress caused in the spacer.
Figure 14:
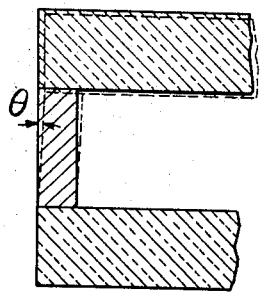
FIG. 14 is a fragmentary sectional view showing the deformation of the spacer.

When the multiple glass sheet glazing unit is loaded, stress is produced in the spacer. The magnitude of this stress is determined in accordance with the magnitude of the load, the size and thickness of the glass sheet, the spacing between the glass sheets, the shape, the material quality of the spacer and the like. As shown in FIG. 14, in case the deformation of definite angle $\theta$ was caused in the spacer by imparting pressure to the glass surface of the multiple glass sheet glazing unit, in which the spacer having the constant thickness was used, the maximum stress $\sigma$ produced in the spacer becomes a function of the thickness $d$. This function has such a form as shown in FIG. 13. That is, $\sigma$ is increased with the increase of $d$, and reaches the maximum value $\sigma_m$ at $d=d_m$. In case of $d>d_m$, $\sigma$ is gradually decreased with the increase of $d$. In case of $d<d_m$, the spacer is too thin to manufacture. Accordingly, the practical range lies in the case of $d>d_m$. In the range of $d>d_m$, the stress produced by the definite load becomes smaller in accordance with the increase of $d$. Accordingly, when the repeated load is applied to the multiple glass sheet glazing unit, the tendency of formation of cracks in the spacer becomes less as the thickness of the spacer increases, and it is possible to prevent the formation of cracks in the spacer by increasing the thickness of the spacer above the definite value $D_1$. On the other hand, however, when the thickness of the spacer is increased, the flexibility of the spacer decreases. When the flexibility of the spacer is decreased, the bonding surface between the spacer and the glass sheet becomes liable to break away. In order to prevent the production of any breaking away of the bonding surface, it is necessary to let the spacer have some flexibility. For this purpose, it is required that the thickness of the spacer is less than the definite value $D_2$.

Thus, in order to prevent the formation of cracks in the spacer and the breaking away of the bonding surface, it is required that the thickness of the spacer is above $D_1$ and at the same time, below $D_2$. $D_1$ and $D_2$ are the function of the magnitude of the repeated load applied to the multiple glass sheet glazing unit. As the load to be applied becomes larger, $D_1$ becomes larger and $D_2$ becomes smaller. When the load becomes high enough, $D_1$ finally becomes larger than $D_2$. In this case, it comes to that there is no existing of such a value as larger than $D_1$ and smaller than $D_2$, and it becomes impossible to obtain the spacer which does not cause cracks in the spacer and is free from the breaking away of the bonding surface.

Reference has been made to the spacer of the definite thickness, but this is true with the spacer of the shape which does not have the definite thickness.

In the spacer of the shape like this, when the thickness of the spacer is increased, the stress to be produced in the spacer becomes smaller and the tendency to cause cracks in the spacer decreases, but at the same time, its flexibility becomes less and the tendency of the production of the breaking away of the bonding surface increases.

Consequently, it was impossible to obtain the multiple glass sheet glazing unit of which performance is guaranteed, in case when used in environment receiving some repeated load.

The present inventors have completed this invention after having executed numerous experiments and labourious studies for the purpose of obtaining such multiple glass sheet glazing unit as can be employed safely in environment receiving the repeated load, by using the spacer having Pb as its principal constituent which is usually employed. That is, the present inventors have found that the case when the multiple glass sheet glazing unit was subjected to the load, the stress produced in the spacer is made small sufficient to prevent the formation of cracks in the spacer and, at the same time, the sufficient flexibility is imparted to the spacer to prevent the breaking away of the bonding surface, by giving such a specific shape to the spacer as described in the following. Namely, according to the present invention, it has been found that it is possible to obtain the multiple glass sheet glazing unit which can be safely employed under environment receiving the repeated load, by employing the spacer, the whole of which is constituted with homogeneous material, and having such a shape that a sectional area per unit length of the spacer in section cut by a plane parallel to the bonding surface is the smallest in case when the cutting has been performed in the middle of the spacer and at least in this neighborhood, the sectional area increases continuously and smoothly as the section gets away from the middle, and the area in this section does not exceed substantially the area of the bonding surface per unit length of the spacer.

This will be fully illustrated in examples as described hereinafter.

Figure 8:
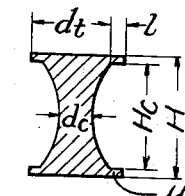
Figure 4:
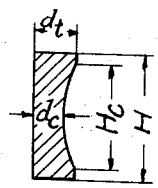
Figure 9:
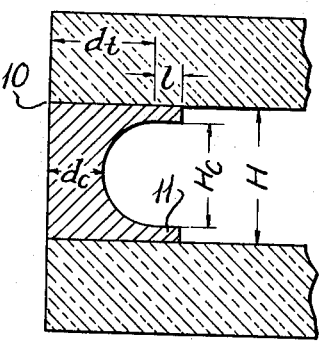
FIG. 9 is a fragmentary sectional view of a further embodiment of a spacer of the present invention applied to the multiple glass sheet glazing unit cut likewise by a plane perpendicular to its axial direction.

As the spacer of the present invention, it is possible to use such various shaped spacers as shown in FIGS. 1 to 7, but these shapes of the spacer are illustrative but not limitative of the invention. It is possible also, for example, at the upper and lower portions of both ends of the spacer to provide the extended portion 11. For example, the spacer shown in FIG. 8 and FIG. 9 is respectively formed by providing with the said extended portions to the spacer shown in FIG. 2 and FIG. 3. It is preferred to make the thickness of these extended portions (this thickness is identical with ½ of $H-H_c$) below 1 mm., and the length of the extended portion $l$ is determined so as to make $d+l$ less than the depth of the sash for holding the multiple glass sheet glazing unit. Such extended portion is very useful to make the bonding between the spacer and the glass sheet more effective.

Figure 3:
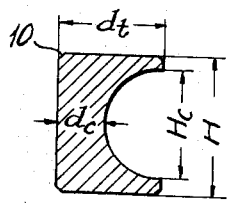
Figure 10:
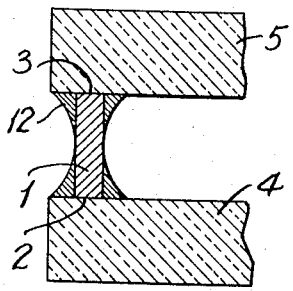
FIG. 10 is a fragmentary sectional view similar to FIG. 9 showing a hitherto known spacer applied to the multiple glass sheet glazing unit.
Figure 11:
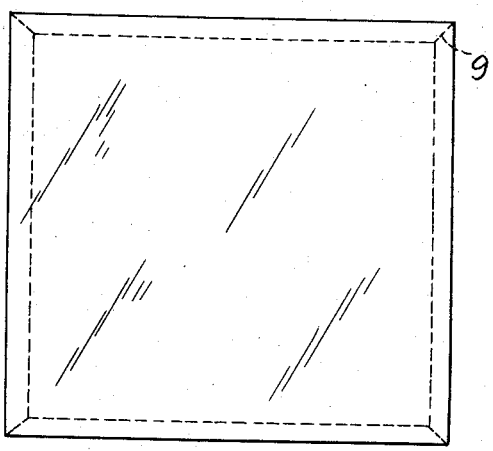
FIG. 11 is a plane view of the multiple glass sheet glazing unit, showing the abutment.
Figure 12:
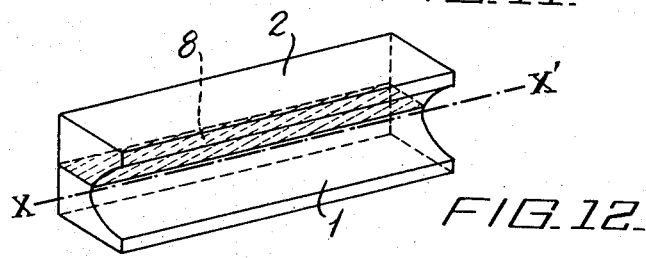
FIG. 12 is a perspective view of one embodiment of a spacer of the present invention.

Also, it is possible, as shown in FIG. 3 and FIG. 9, to cut away edge portion 10 of the bonding surface of the spacer. This is very useful to make the bonding between the spacer and the glass sheet more effective. The spacer can be shaped in various shapes as illustrated above. However, it is necessary to constitute the whole of the spacer with homogeneous material, in order to obtain the multiple glass sheet glazing unit which is able to endure the repeated load. For example, as shown in FIG. 10, by padding both side surfaces of the spacer 1 which has the constant thickness, with solder in such a shape as shown by 12, it is possible to make the shape of the whole similar to the spacer of the present invention. However, in this case, it is impossible to obtain such spacer as is able to endure the repeated load, because the said spacer is not as a whole constituted with homogeneous material. This will be apparent from the example as set forth hereinafter.

The thicknesses of the spacer $d_c$ and $d_t$ are determined in accordance with the size, the thickness, the spacing between the glass sheets, the magnitude of the repeated load applied to the multiple glass sheet glazing unit and the like, but it is possible to obtain especially good results by adjusting $d_c=1.2$ to 4 mm. and $d_t=4$ to 7 mm. in the practical range of the size, the thickness of the glass sheets and the spacing between the glass sheets. The practical range of the size, the thickness, and the spacing as described above means that the length of one side of the glass sheet is in the range of 500 to 2,000 mm., the thickness 3 to 8 mm., and the spacing between the glass sheets 5 to 12 mm. Within this range, the relation $d_c=(1.2$ to $2.4)$ $d_m$ can be obtained.

In Table 1 is shown the relation of the size, the thickness and the spacing with $d_m$.

TABLE 1

| Size of the glass sheet (mm.) | Thickness of the glass sheets (mm.) | Spacing between the glass sheets (mm.) | $d_m$ (mm.) |
| --- | --- | --- | --- |
| 2,000 x 1,000 | 5 | 6 | 1.6 |
| 2,000 x 1,000 | 5 | 12 | 1.6 |
| 2,000 x 1,000 | 6 | 6 | 1.6 |
| 2,000 x 1,000 | 6 | 12 | 1.6 |
| 1,500 x 660 | 3 | 6 | 1.0 |
| 1,500 x 660 | 5 | 5 | 1.0 |
| 1,500 x 660 | 5 | 6 | 1.0 |
| 1,500 x 660 | 5 | 12 | 1.1 |
| 1,500 x 660 | 6 | 5 | 1.0 |
| 1,500 x 660 | 6 | 6 | 1.0 |
| 1,500 x 660 | 6 | 12 | 1.0 |
| 1,000 x 500 | 3 | 5 | 0.8 |
| 1,000 x 500 | 5 | 6 | 0.8 |
| 500 x 500 | 3 | 5 | 0.7 |
| 500 x 500 | 5 | 6 | 0.7 |

This invention is further described in the following example, which is illustrative but not limitative thereof.

EXAMPLE

A multiple glass sheet glazing unit held at its 4 sides in the sash was kept in an air tight chamber. The pressure in this chamber was changed periodically from 50 to 600 mm. aq, and thus the repeated load was applied to the multiple glass sheet glazing unit. The amplitude of the pressure change is 550 mm. aq. and the number of oscillations was 32 cycles per minute. In the following Table 2 is shown the number of times of the repeated load applied to the multiple glass sheet glazing unit and the state thereof after test.

Specification of the multiple glass sheet glazing unit of each number is shown as follows:

*No. 1*

Figure 2:
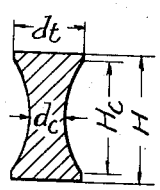
Figure 6:
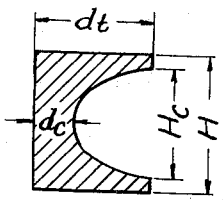

| | |
| --- | --- |
| The size of the glass sheets | 1,500 x 660 mm. |
| The thickness of the glass sheets | 6 mm. |
| The spacing between the glass sheets | 6 mm. |
| The shape of the spacer | The shape as shown in FIG. 1 and $d_c=1.8$ mm., $d_t=5$ mm. |
| The composition of the spacer | Pb 98.0%, Sn 1.2% and Sb 0.8%. |

*No. 2*

Figure 5:
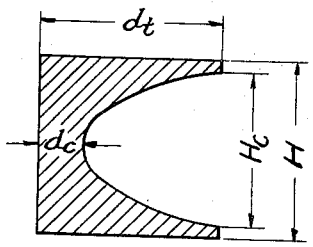
FIGS. 2 to 8 are respectively sectional views of various different embodiments of a spacer of the present invention cut likewise by a plane perpendicular to their axial direction.

| | |
| --- | --- |
| The size, the thickness and the spacing | The same as No. 1. |
| The shape of the spacer | The shape as shown in FIG. 5 and $d_c=1.8$ mm., $d_t=5$ mm. |
| The composition of the spacer | Pb 99.2%, Sb 0.5% and Cd 0.3%. |

*No. 3*

| | |
| --- | --- |
| The size, the thickness and the spacing | The same as No. 1. |
| The shape of the spacer | The shape as shown in FIG. 7 and $d_c=1.8$ mm., $d_t=5$ mm. |
| The composition of the spacer | Pd 96.0%, Sn 3.7% and Bi 0.3%. |

*No. 4*

| | |
| --- | --- |
| The size, the thickness and the spacing | The same as No. 1. |
| The shape of the spacer | The shape as shown in FIG. 8 and $d_c=1.8$ mm., $d_t=4$ mm., $H_c=4$ mm., $l=1$ mm. |
| The composition of the spacer | Pd 93.5%, Sn 5.7% and Bi 0.8%. |

*No. 5*

| | |
| --- | --- |
| The size, the thickness and the spacing | The same as No. 1. |
| The shape of the spacer | The shape as shown in FIG. 9 and $d_c=1.8$ mm., $d_t=4.3$ mm. |
| The composition of the spacer | The same as No. 1. |

*No. 6*

| | |
| --- | --- |
| The size, the thickness and the spacing | The same as No. 3. |
| The shape of the spacer | A 1.8 mm. thick rectangular spacer which was padded with solder and formed into the same shape as No. 1. (cf. FIG. 10). |

No. 7

| | |
|---|---|
| The composition of the spacer | The same as No. 3. |
| The size of the glass sheets | 1,500 x 660 mm. |
| The thickness of the glass sheets | 6 mm. |
| The spacing between the glass sheets | 12 mm. |
| The shape of the spacer | The shape as shown in FIG. 1 and $d_c = 1.8$ mm., $d_t = 5$ mm. |

No. 8

| | |
|---|---|
| The composition of the spacer | The same as No. 3. |
| The size of the glass sheets | 2,0000 x 1,000 mm. |
| The thickness of the glass sheets | 8 mm. |
| The spacing between the glass sheets | 6 mm. |
| The shape of the spacer | The same as No. 1. |
| The composition of the spacer | The same as No. 3. |

No. 9

| | |
|---|---|
| The size of the glass sheets | 500 x 500 mm. |
| The thickness of the glass sheets | 3 mm. |
| The spacing between the glass sheets | 5 mm. |
| The shape of the spacer | The shape as shown in FIG. 1 and $d_c = 1.2$ mm., $d_t = 5$ mm. |

No. 10

| | |
|---|---|
| The composition of the spacer | The same as No. 3. |
| The size, the thickness and the spacing | The same as No. 1. |
| The shape of the spacer | The shape as shown in FIG. 1 and $d_c = 0.8$ mm., $d_t = 3$ mm. |

No. 11

| | |
|---|---|
| The composition of the spacer | The same as No. 3. |
| The size, the thickness and the spacing | The same as No. 1. |
| The shape of the spacer | The shape as shown in FIG. 1 and $d_c = 1.2$ mm., and $d_t = 5$ mm. |
| The composition of the spacer | The same as No. 3. |

No. 12

| | |
|---|---|
| The size, the thickness and the spacing | The same as No. 1. |
| The shape of the spacer | The shape as shown in FIG. 1 and $d_c = 2.4$ mm., $d_t = 5$ mm. |
| The composition of the spacer | The same as No. 3. |

No. 13

| | |
|---|---|
| The size, the thickness and the spacing | The same as No. 1. |
| The shape of the spacer | The shape as shown in FIG. 1 and $d_c = 3.0$ mm., $d_t = 7$ mm. |
| The composition of the spacer | The same as No. 3. |

TABLE 2

| No. of the spacer | Number of times of the repeated load | Appearance after the repeated loading |
|---|---|---|
| 1 | 50,000 | All right (no abnormally). |
| 2 | 50,000 | All right. |
| 3 | 50,000 | Do. |
| 4 | 50,000 | Do. |
| 5 | 50,000 | Do. |
| 6 | 2,000 | Remarkable breaking away of the bonding surfaces. |
| | 10,000 | Cracks in the spacer. |
| 7 | 50,000 | All right. |
| 8 | 50,000 | Do. |
| 9 | 50,000 | Do. |
| 10 | 1,000 | Cracks in the spacer. |
| 11 | 20,000 | All right. |
| | 50,000 | Some cracks in the spacer. |
| 12 | 20,000 | All right. |
| | 50,000 | Some breaking away of the bonding surfaces. |
| 13 | 1,000 | Remarkable breaking away of the bonding surfaces. |

What we claim is:

1. A spacer for multiple glass sheet glazing unit having a pair of parallel glass-bonding surfaces, wherein a sectional area of the spacer per unit length in section cut by a plane parallel to the bonding surface is the smallest in case when the cutting has been performed in the middle of the spacer, and at least in this neighborhood, the sectional area increases continuously and smoothly as the section gets away from the middle, and the area in this section does not exceed substantially the area of the bonding surface per unit length of the spacer, and moreover, the whole of the spacer is constituted with homogeneous material.

2. A spacer as defined in claim 1, in which the smallest width in section is 1.2 to 4 mm.

3. A spacer as defined in claim 1, in which the largest sectional width at the portion where the sectional area increases continuously and smoothly, is 4 to 7 mm.

4. A spacer as defined in claim 1, in which the sectional area increases continuously and smoothly, only in the neighborhood of the middle of the spacer.

5. A spacer as defined in claim 1, in which the sectional area increases continuously and smoothly over the whole height of the spacer.

6. A spacer as defined in claim 1, in which one of the side surfaces of the spacer is formed by a plane and the other is formed by a curved cylindrical surface at least in the neighborhood of the middle of the spacer.

7. A spacer as defined in claim 1, in which both side surfaces of the spacer are respectively formed by a curved cylindrical surface at least in the neighborhood of the middle of the spacer.

8. A spacer as defined in claim 6, in which the side surface formed by a plane is the outer side surface.

9. A spacer as defined in claim 8, in which the spacer is composed of an alloy containing Pb in an amount of 90% or more than 90% by weight.

10. A spacer as defined in claim 9, in which at least one element selected from the group consisting of Bi, Sn, Sb and Cd is employed as a by-constituent.

11. A spacer as defined in claim 10, in which at least one of Cu and Ca is admixed as a microelement.

References Cited

UNITED STATES PATENTS 3,140,927    7/1964    Pfund et al.    29—193
3,290,184    12/1966    Minck    29—193

DAVID L. RECK, *Primary Examiner.*

RICHARD O. DEAN, *Examiner.*